G. E. AUTRY.
TRANSPLANTING MACHINE.
APPLICATION FILED SEPT. 10, 1909.

965,980.

Patented Aug. 2, 1910.

2 SHEETS—SHEET 2.

UNITED STATES PATENT OFFICE.

GEORGE E. AUTRY, OF GRANTON, OKLAHOMA.

TRANSPLANTING-MACHINE.

965,980. Specification of Letters Patent. Patented Aug. 2, 1910.

Application filed September 10, 1909. Serial No. 517,150.

*To all whom it may concern:*

Be it known that I, GEORGE E. AUTRY, a citizen of the United States, residing at Granton, in the county of Major and the State of Oklahoma, have invented a new and useful Plant-Transplanting Machine, of which the following is the specification.

Figure 1:
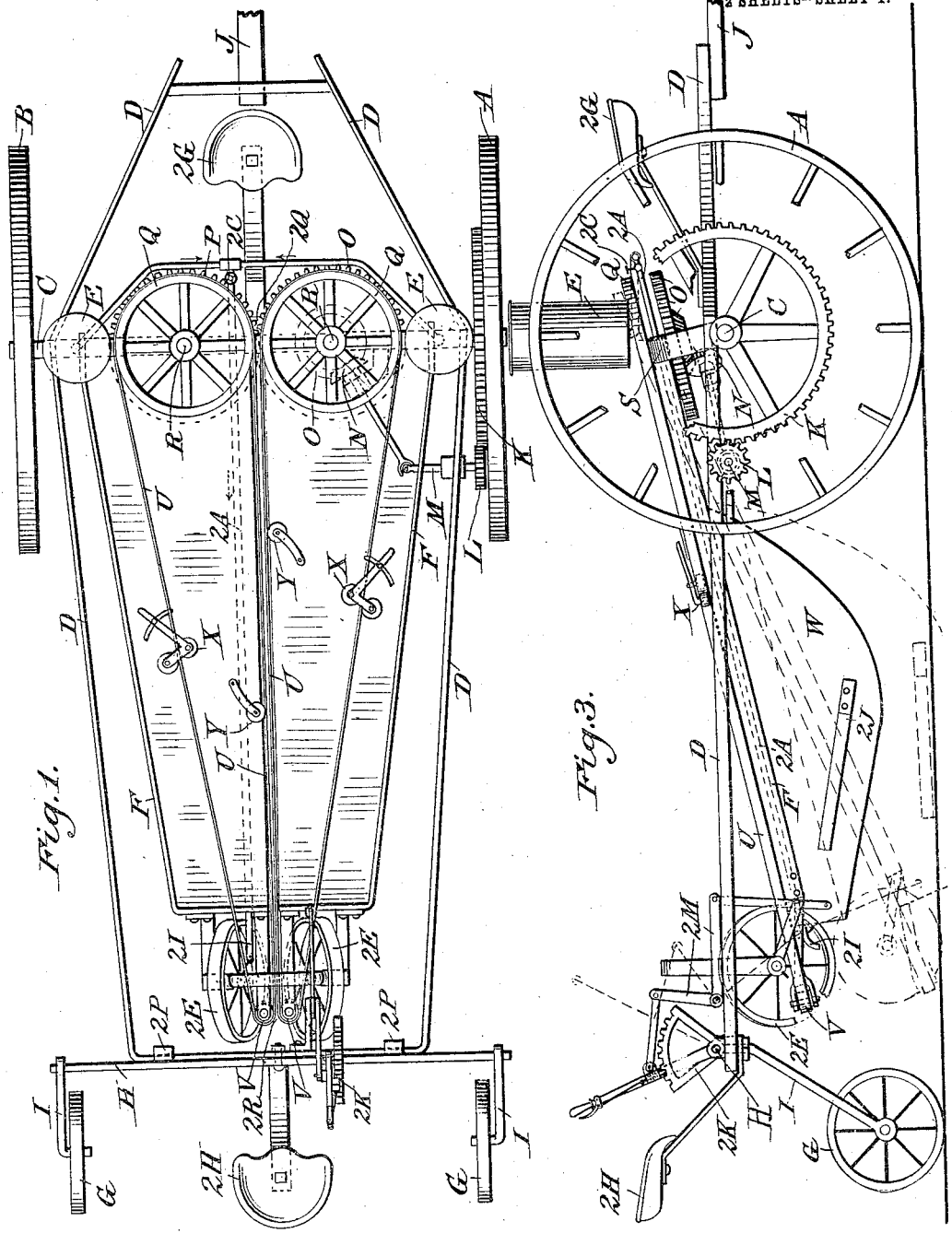
Figure 2:
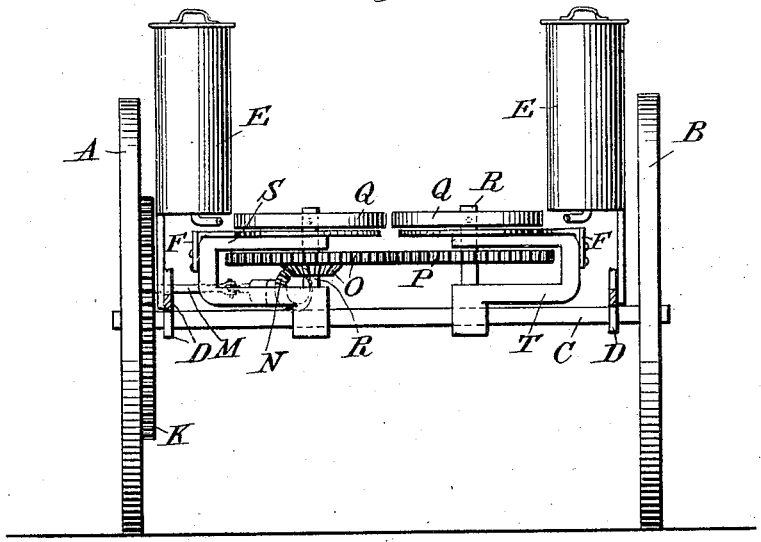

My invention relates to a machine as hereinafter described for the purpose of transplanting of plants, such as sweet-potatoes, cabbage, tobacco, tomatoes and plants of like nature, and has for its object to render the process more expeditious, accurate and successful, while at the same time greatly reducing the cost of the operation. I attain these objects by the mechanism illustrated in the accompanying drawing in which, Figure 1, is a plan of the machine as it appears ready for use. Fig. 2, is a view of the system of gearing. Fig. 3, is a side view of the machine, showing shoe, press-wheels and surfacer bars together with apparatus for watering plants, as hereinafter described. Also showing leverage system for adjusting the rear of sub-frame and machinery attached.

Similar letters and figures refer to similar parts through the several views.

Wheels A and B support axle C to which are attached the several parts of frame D, as shown in Fig. 1, wheels G supporting axle H, by shafts I and I, axle H being attached to frame D, by pivot connection in the center, working in slotted bars 2P and 2P, at each side, so machine can adjust itself to uneven ground, without strain on frame. The tongue J is attached to frame D constituting the main frame and carrier for the machine as shown in Fig. 1. A subframe F is attached to an axle C and serves to support the mechanism driven by wheel A provided with a cog wheel K meshing with a pinion L having a shaft M, connected by a knuckle joint with the shaft of the pinion N, which drives combination pinion and cog O, which drives cog P, and pulleys Q and Q, which are connected to cogs O and P by shafts R and R, as shown in Fig. 2. This gearing is supported by castings S and T. Pulleys Q and Q drive belts U and U around pulleys V and V, as shown in Fig. 1.

Two pieces of sheet iron cover frame F, forming deck for belts U and U, and base for pulleys X and X and Y and Y, leaving an opening or passage way in center for plants to pass between, while being conveyed from point of reception, as indicated by 2Q, to point of deposit as indicated by 2R, as shown in Fig. 1. Belts U and U are used for carrying plants from the point of reception 2Q, where they are placed by the planter occupying seat 2G. Belts U and U are engaged by pulleys Y and Y to produce pressure between belts, sufficient to convey plants from the point of reception to the point of deposit, as before indicated, where said plant is watered by the discharge of water from tube 2A, through discharge 2I, while at the same time press-wheels 2E and 2E press the dirt firmly about the roots of the plant. During the process of watering and pressing the dirt to the roots of the plant, it is being securely held by belts U and U, whose backward motion being the same as the forward motion of the machine, leaves the plant in an upright or erect position when released.

The rear of frame F, to which are attached shoe W and press-wheels 2E and 2E, and other attachments as shown and described in the several views, is adjusted by leverage system 2M and 2K, as shown in Fig. 3. Surfacer bars 2J and 2J, attached to the sides of shoe W, Fig. 3 are so arranged, as to slide on the ground, so that shoe W, will be a uniform depth in the ground while the machine is in operation, allowing press-wheels 2E and 2E to press the dirt about the roots of the plant accurately.

Water tanks E and E, as shown in Figs. 1 and 2, are so arranged as to supply water through valve 2C into tube 2A, discharging the same through outlet 2I, for the purpose before described.

I claim:

1. In a machine of the class described, a wheeled vehicle, a frame hinged at one end to the forward axle of the vehicle, having its swinging end adjacent to the rear axle, a deck mounted on said frame and having a longitudinal slot, belt wheels mounted on one end of said frame, horizontal toothed wheels secured thereto, a driving mechanism connecting one of said vehicle wheels with one of said toothed wheels, a pair of endless belts mounted on said belt wheels and extending from end to end of said frame in alinement with the slot in the deck, and having vertical surfaces and inner runs contiguous, and means for raising and lowering said frame.

2. In a machine of the class described, a wheeled vehicle, a frame hinged at one end to the forward axle of the vehicle and having its swinging end adjacent to the rear axle, a sheet iron deck mounted on said frame, belt wheels mounted on one end of said frame, horizontal toothed wheels secured thereto, a beveled gearing on one of the toothed wheels and a link shaft connecting said beveled gear with one of the vehicle wheels, a pair of endless belts mounted on said belt wheels, and extending from end to end of said frame and having vertical surfaces and inner runs contiguous, means for pressing the belts together, and means for raising and lowering said frame.

GEORGE E. AUTRY.

Witnesses:
WM. HAVILAND,
EMMA RINGER.